US006781570B1

(12) United States Patent
Arrigo et al.

(10) Patent No.: US 6,781,570 B1
(45) Date of Patent: Aug. 24, 2004

(54) WIRELESS OPTICAL INPUT DEVICE

(75) Inventors: Simone Arrigo, Ecublens (CH); Daniel A. Zahnd, Lausanne (CH); Julien Piot, Rolle (CH); Florian Kehlstadt, Aclens (CH)

(73) Assignee: Logitech Europe S.A., Romanel-sur-Morges (CH)

( * ) Notice: Subject to any disclaimer, the term of this patent is extended or adjusted under 35 U.S.C. 154(b) by 217 days.

(21) Appl. No.: 09/709,046

(22) Filed: Nov. 9, 2000

(51) Int. Cl.[7] .................................................. G09G 5/08
(52) U.S. Cl. ......................... 345/158; 345/156; 345/157
(58) Field of Search ............................... 345/156–158, 345/165, 166, 859, 810, 811

(56) References Cited

U.S. PATENT DOCUMENTS

| 4,521,772 A | | 6/1985 | Lyon |
| 4,521,773 A | | 6/1985 | Lyon |
| 4,734,685 A | * | 3/1988 | Watanabe .................... 340/710 |
| 4,794,384 A | | 12/1988 | Jackson |
| 4,799,055 A | | 1/1989 | Nestler et al. |
| 5,288,993 A | | 2/1994 | Bidiville et al. ............. 250/221 |
| 5,420,943 A | | 5/1995 | Mak |
| 5,453,758 A | * | 9/1995 | Sato ............................ 345/158 |
| 5,457,478 A | * | 10/1995 | Frank .......................... 345/158 |
| 5,481,265 A | * | 1/1996 | Russell ......................... 341/22 |
| 5,578,813 A | | 11/1996 | Allen et al. |
| 5,578,817 A | | 11/1996 | Bidiville et al. ............. 250/221 |
| 5,644,139 A | | 7/1997 | Allen et al. |
| 5,680,157 A | | 10/1997 | Bidiville et al. ............. 345/165 |
| 5,703,353 A | | 12/1997 | Blalock et al. |
| 5,703,356 A | | 12/1997 | Bidiville et al. ............. 250/221 |
| 5,729,008 A | | 3/1998 | Blalock et al. |
| 5,729,009 A | | 3/1998 | Dändliker et al. ........ 250/208.2 |
| 5,769,384 A | | 6/1998 | Baumgartner et al. |
| 5,786,804 A | | 7/1998 | Gordon |
| 5,793,032 A | | 8/1998 | Bard et al. |
| 5,793,356 A | | 8/1998 | Svancarek et al. |
| 5,825,044 A | | 10/1998 | Allen et al. |
| 5,854,482 A | | 12/1998 | Bidiville et al. ............. 250/221 |
| 5,854,621 A | | 12/1998 | Junod et al. ................. 345/158 |
| 5,881,366 A | | 3/1999 | Bodenmann et al. ......... 455/66 |

(List continued on next page.)

FOREIGN PATENT DOCUMENTS

| DE | 298 23 417 | 5/1999 | |
| WO | WO 98/37379 | 8/1998 | ............ G01B/9/02 |
| WO | WO 99/39304 | 8/1999 | |
| WO | WO 00/33245 | 6/2000 | |
| WO | WO 00/38103 | 6/2000 | |

OTHER PUBLICATIONS

Agilent Technologies Technical Data on "Solid–State Optical Mouse Sensor with PS/2 and Quadrature Outputs" (HDNS–2000, May 2000).*
Agilent Technologies, "Solid–State Optical Mouse Sensor with PS/2 and Quadrature Outputs," Technical Data, May 2000, 10 pages.
Bortz, J., Shatz, N., Pitou, D., "Optimal Design of a Nonimaging Projection Lens for Use With an LED Source and a Rectangular Target", Proceedings of SPIE, vol. 4092, 2000.
Hinckley, Ken and Sinclair, Mike, "Touch–Sensing Input Devices," Microsoft Research (To appear in ACM CHI'99 Conf. On Human Factors in Computing Systems), 1999, 8–pages.

*Primary Examiner*—Kent Chang
*Assistant Examiner*—Tom Sheng (57) ABSTRACT

One embodiment of the present invention provides a wireless input device that employs optical sensing to effect the likes of cursor movement and scrolling. Power management techniques can be optionally employed to avoid premature depletion of the wireless input device's power source. Another embodiment of the present invention provides a wireless device having a power management algorithm controlling its power consumption. Another embodiment of the present invention provides a method for managing the power consumption of a wireless device.

21 Claims, 5 Drawing Sheets

U.S. PATENT DOCUMENTS

| | | |
|---|---|---|
| 5,907,152 A | 5/1999 | Dändliker et al. .......... 250/221 |
| 5,940,217 A | 8/1999 | Broome et al. |
| 5,994,710 A | 11/1999 | Knee et al. |
| 6,002,427 A * | 12/1999 | Kipust ........................ 348/156 |
| 6,002,525 A | 12/1999 | Poulo et al. |
| 6,021,009 A | 2/2000 | Borodovsky et al. |
| 6,040,592 A | 3/2000 | McDaniel et al. |
| 6,040,950 A | 3/2000 | Broome |
| 6,049,338 A | 4/2000 | Anderson et al. |
| 6,057,540 A | 5/2000 | Gordon et al. |
| 6,084,574 A | 7/2000 | Bidiville ..................... 345/166 |
| 6,104,020 A | 8/2000 | Knee et al. |
| 6,145,746 A | 11/2000 | Bard et al. |
| 6,151,015 A | 11/2000 | Badyal et al. |
| 6,175,357 B1 | 1/2001 | Gordon |
| 6,188,057 B1 | 2/2001 | Misek |
| 6,233,368 B1 | 5/2001 | Badyal et al. |
| 6,281,882 B1 | 8/2001 | Gordon et al. |
| 6,424,335 B1 * | 7/2002 | Kim et al. .................. 345/158 |
| 2003/0028688 A1 | 2/2003 | Tiphane et al. |

\* cited by examiner

WIRELESS OPTICAL INPUT DEVICE

FIELD OF THE INVENTION

The invention relates to wireless devices, and more particularly, to a wireless optical input device that allows a user to interact with a computer.

DESCRIPTION OF THE RELATED ART

There are a number of computer input devices that employ an electromechanical arrangement for effecting cursor movement and scrolling. In such an arrangement, the mechanical movement of a roller ball is converted into electrical signals. The electrical signals are then encoded into information that a computer can use, such as cursor X-Y position data or scrolling direction and distance. Mice and trackballs are the most common input devices that employ this type of electromechanical arrangement. In general, however, there are numerous applications for an electromechanical arrangement in computer input devices.

One problem associated with this type of electromechanical arrangement is that the actuating assembly (e.g., roller ball and the corresponding rollers) is prone to malfunction because of debris and or mechanical breakdown. Moreover, input devices such as mice require that the roller ball be in contact with a special surface (e.g., mouse pad) in order to function properly. This special surface is equally prone to debris and wear and tear, and tends to limit the area upon which the input device can move. For example, at times, a user may have to stop rolling the mouse, pick it up, and place it back down on the mouse pad so that the user can keep moving the mouse in the same direction in order to get the cursor to a desired position.

In response to solving these problems, optical assemblies have begun to replace the electromechanical assemblies. Unlike its electromechanical counterpart, an optical assembly does not have a roller ball and the corresponding rollers. As such, an input device employing an optical sensor assembly for performing functions such as cursor movement and scrolling is not prone to debris or mechanical wear, and can be used on most surfaces. Generally, an optical sensor assembly employs an optical sensor and a light emitting diode (LED). As the input device is moved, light from the LED reflects off a surface and is received by the optical sensor thereby forming a series of images. Distance and direction of cursor or scroll bar movement can then be determined from the images. In short, optical input devices provide an elegant solution to problems associated with electromechanical input devices.

However, it appears that there is currently no computer input device that employs such optical sensing technology in the context of a wireless input device. Wireless technology allows input devices such as mice and keyboards to be untethered from the host computer thereby providing the user with a greater degree of mobility and reducing desktop clutter. Thus, there is a need for an input device that offers the benefits of a wireless connection as well as the benefits associated with an optical sensor for effecting cursor movement, such as a wireless optical mouse.

Problems associated with such a wireless optical input device stem from competing factors underlying the two technologies. For instance, on one hand, optical assemblies require a significant amount of power (e.g., for powering the LED and optical sensor). On the other hand, wireless input devices are not tethered to an external power source. Thus, one must be provided internally to such a wireless input device. This basically limits the power source to a battery included in the wireless input device. To complicate matters, both practical and economic reasons dictate that the battery size cannot exceed certain physical constraints thereby limiting the life of the battery. As such, power intensive technology can prematurely deplete a battery included in a wireless input device. Hence, an effective power management scheme should be available to such a device.

There is a need, therefore, for a wireless input device that employs optical sensing to effect the likes of cursor movement and scrolling. Such a wireless input device should optionally employ power management techniques that allow the battery to avoid premature depletion. In a more general sense, there is a need-for power management techniques in wireless devices that employ power intensive technology.

BRIEF SUMMARY OF THE INVENTION

One embodiment of the present invention provides a wireless input device that employs optical sensing to effect the likes of cursor movement and scrolling. The wireless input device can optionally employ power management techniques that allow the wireless input device's power source to avoid premature depletion. Another embodiment of the present invention provides a wireless device having a power management algorithm controlling its power consumption. Another embodiment of the present invention provides a method for managing the power consumption of a wireless device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1A:
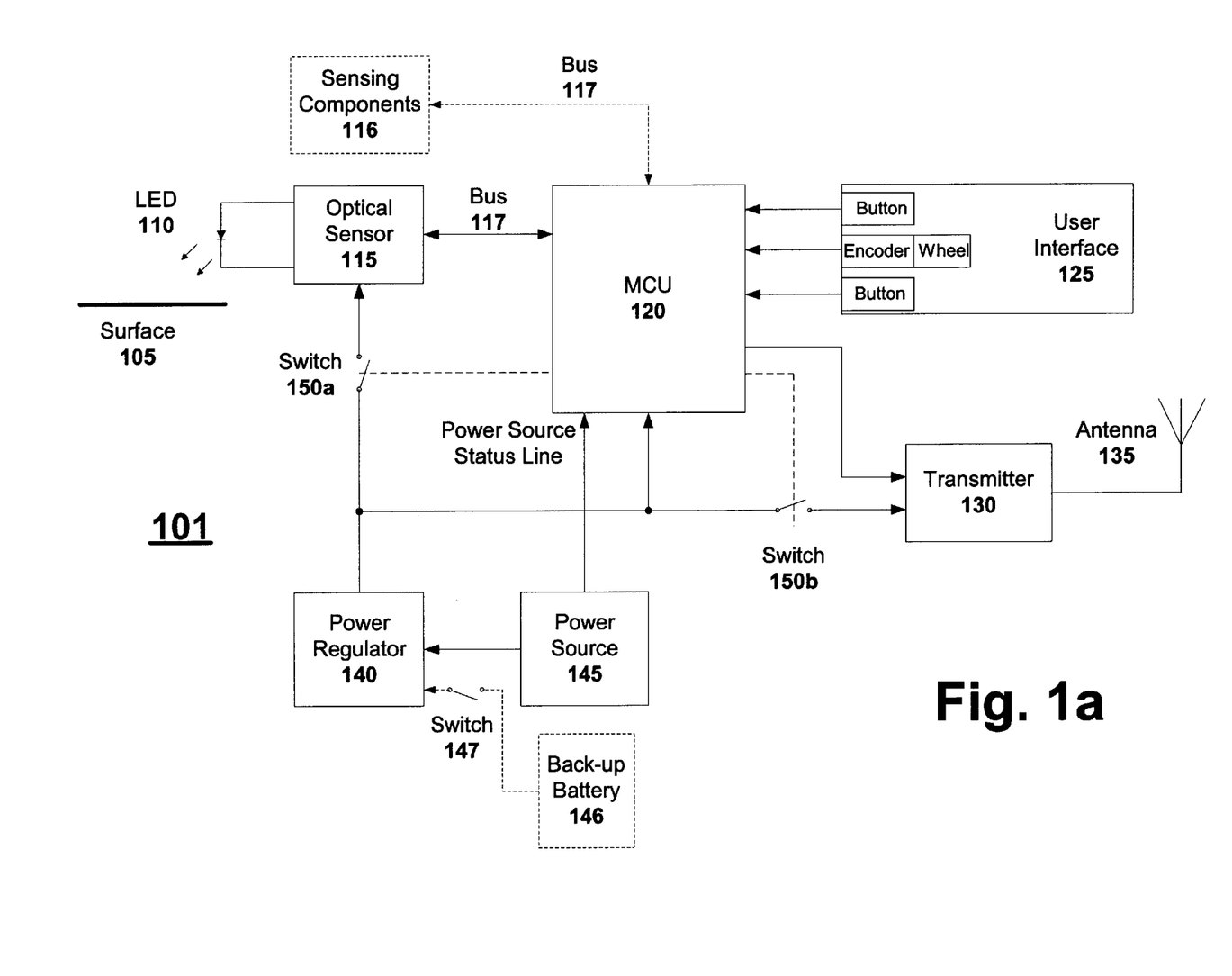
FIG. 1a illustrates a block diagram of a wireless input device that employs an optical sensor in accordance with one embodiment of the present invention.

FIG. 1a illustrates a block diagram of a wireless input device that employs an optical sensor in accordance with one embodiment of the present invention. Device 101 includes a LED 110, an optical sensor 115, a microcontroller unit (MCU) 120, a user interface 125, a transmitter 130, an antenna 135, a power regulator 140, a power source 145 and switches 150a and 150b. One embodiment of optical sensor 115 includes a charged-coupled device (CCD) array and a lens for focusing reflected light onto the array. In alternative embodiments, optical sensor 115 can have a photo-sensitive element other than a CCD array, such as a number of photo-diodes or photo-transistors. In addition, optical sensor 115 might have no lens (e.g., reflected light is received directly by a photo-sensitive element) or more than one lens (e.g., one lens between LED 110 and surface 105, and a second lens between surface 105 and a photo-sensitive element of optical sensor 115). Likewise, LED 110 might have a lens integrated therein. Note that other device and component configurations are possible in light of this disclosure. For example, LED 110 could be coupled between two I/O (input/output) ports of MCU 120 rather than to optical sensor 115. In this case, MCU 120 would control LED 110. Also, surface 105 could be a roller ball of a trackball assembly, or the surface of a touchpad (e.g., whether stand alone or integrated into a wireless keyboard). Device 101 might also include other components not shown in FIG. 1*a*, such a memory device accessible by MCU 120 for storing statistical information relevant to the use of device 101. Other device and component configurations will be apparent in light of this disclosure.

Overview

In one embodiment, device 101 allows a user to interact (e.g., effect cursor movement, scrolling, or button action) with a host via a wireless connection. Intended movement relevant to device 101 is optically sensed and translated into position data, and is communicated to the host receiver (e.g., computer) via the wireless connection. Device 101 can be, for example, a wireless optical mouse where the mouse is moved over surface 105 to effect the likes of cursor movement and scrolling on a screen associated with a computer to which the mouse is wirelessly coupled. Light from LED 110 reflects off surface 105 as the mouse moves, and the reflected light is focused on a photo-sensitive element of the optical sensor via a lens. In such an embodiment, surface 105 could be any surface such as a table top, sheet of paper, book cover, wall, brief case or mouse pad. Alternatively, surface 105 could be a surface such as a hand, forearm, leg or chest of a user. The point here is that device 101 will work on many diverse surfaces 105 and need not be limited to a special mouse pad or other dedicated surface. Such an embodiment of device 101 is thus independent of surface 105.

In an alternative embodiment, device 101 can be integrated into a wireless keyboard where device 101 generally remains stationary while cursor movement is effected by the likes of a stylus or human finger moving across surface 105. In such an embodiment, surface 105 might be a window that is proximally located to a lens of optical sensor 115. Light from LED 110 reflects off the object as the object moves across surface 105, and the reflected light is focused on a photo-sensitive element of the optical sensor via the lens. Intended movement across surface 105 is thus detected by optical sensor 115, translated into position data, and communicated to the host receiver via the wireless connection. In this type of embodiment, device 101 can include surface 105. Regardless of whether device 101 is moved across an independent surface 105, or remains stationary while an external object is moved across a surface 105 of device 101, any resulting movement is detected, analyzed and translated into position data that (if appropriate) is communicated to the host (e.g., game console) via the wireless connection.

Note that the present invention need not be limited to computer input devices, but can be applied to any device requiring power management in order to prolong the life of a limited power source (e.g., a battery). For example, cell phones, pagers, personal digital assistants, or any electronic device associated with a power use scheme that can be characterized by a number of modes of awareness (based on factors such as the quantitative and qualitative nature of input stimulus and established patterns of use) can employ the techniques described herein. As such, the present invention is not intended to be limited to any one embodiment or configuration of components. Rather, numerous wireless device-types and component configurations can employ the present invention. For instance, any wireless devices employing power intensive technology, such as optical technology, laser technology, and interferometry technology can employ the present invention.

Components

Power source 145 provides power to device 101, and can be a conventional battery. The battery can be rechargeable, but need not be, and has a voltage output capability that depends on the componentry being powered. In one embodiment, power source 145 is a rechargeable, 0.8 to 5.0 volt DC nickel cadmium battery (or a series configuration of such batteries). Other battery technologies, such as nickel hydride, lithium ion, lithium polymer, or zinc air can also realize power source 145. A number of back-up batteries may be provided as well. A capacitor can be provided to temporarily maintain power (e.g., for the purpose of preserving RAM contents included in MCU 120) while a battery is being switched out, whether automatically by MCU 120 or manually by a user. Numerous other power source configurations, including power back-up schemes, can be implemented to effect power source 145 in light of this disclosure.

The voltage output of power source 145 is regulated by power regulator 140. In one embodiment, power regulator 140 is a conventional DC to DC converter that converts a DC voltage output of power source 145 to a particular voltage (e.g., 3.2 volts DC), and provides that voltage to various components of device 101. For example, in the embodiment shown, the output of power regulator 140 is provided to optical sensor 115, MCU 120 and transmitter 130. As can be seen, the applied load varies depending on the state of switches 150*a* and 150*b*, which switch power to optical sensor 115 and transmitter 130, respectively. As such, power regulator 140 can also provide the necessary voltage regulation depending on factors such as varying load conditions and the voltage supply tolerance of the componentry being supplied power.

Transmitter 130 receives power from power regulator 140 via switch 150*b*. Switch 150*b* can be, for example, a metal oxide semiconductor (MOS) type switch, and is under the control of MCU 120. Switch 150*b* can alternatively be integrated into MCU 120, or implemented via an I/O port of MCU 120. Other switch types having a state (e.g., open or closed) that is responsive to a control line can be used here as well. By opening switch 150*b*, all power to transmitter 130 is completely removed thereby eliminating further power consumption by transmitter 130. Once MCU 120 determines that transmitter 130 needs power based on user input data (e.g., from optical sensor 115 or user interface 125), the control line of switch 150*b* is set to the close state (e.g., via an I/O port of MCU 120), and switch 150*b* is closed accordingly. MCU 120 performs any necessary translation on the user input data (e.g., converting mouse movement data into cursor position data, or button action into action data). The user input data is then applied to transmitter 130 via an I/O port of MCU 120. Transmitter 130 modulates the user input data and transmits it to the corresponding host receiver via antenna 135.

In one embodiment, transmitter 130 is a conventional radio frequency (RF) or microwave transmitter. In an alternative embodiment, transmitter 130 may be replaced by a conventional transceiver 130 (not shown) thereby allowing bi-directional communication between device 101 and a host system. In this application, device 101 might be an electronic device such as a personal digital assistant receiving a wireless communication from a host computer coupled to the Internet. For example, transceiver 130 may receive via antenna 135 an updated address book or an instruction set that can be stored in a RAM or non-volatile memory such as an electronically erasable programmable ROM or flash memory included in MCU 120. Likewise, an e-mail message might be received for viewing on a display associated with device 101. Such communication information can be demodulated and filtered by transceiver 130, and then provided to the corresponding I/O port of MCU 120 for any necessary processing.

In addition, the receiver circuit of transceiver 130 can be configured to receive communication information from a number of different host-types. In such an embodiment, transceiver 130 might include a dedicated antenna 135 and physical layer (not shown) for each type of host that is supported. For instance, a first host may be a Bluetooth-based cell phone and a second host might be a RF-based signaling device. Such a signaling device might be, for example, configured to detect stock prices as they are posted on Internet accessible resources. If the signaling device detects a strike price on a particular stock, it can transmit an RF signal to device 101 thereby alerting the user that action must be taken (e.g., a buy/sell indication). Regardless of the type of communication information received by transceiver 130, switch 150b should remain closed during the time period when such communication information is expected to be received. Thus, a time schedule of expected transmissions to device 101 can be provided to MCU 120. MCU 120 can then control the state of switch 150b based on the provided time schedule. Alternatively, switch 150b can always remain closed when device 101 is capable of receiving communication information.

User interface 125 allows a user to provide various input stimuli. In the embodiment shown, user interface 125 includes two buttons and a wheel. These items are generally referred to as user interface elements. The wheel is operatively coupled to an encoder (e.g., mechanical or optical) for converting rotations of the wheel into electrical signals that can be processed by MCU 120. The buttons and encoder output are each coupled to an I/O port of MCU 120. Such user interface elements are typical of a user input device, such as a mouse or trackball. However, other user interface elements can be employed depending on the nature of device 101. For example, a personal digital assistant might include a number of buttons, such as a menu button, a to-do-list button, a calendar button, or a scroll button. Various other types of user interface element configurations can be employed for user interface 125, and the present invention is not intended to be limited to any one embodiment.

LED 110 is operatively coupled to optical sensor 115, which controls LED 110. Light from LED 110 reflects from surface 105, or an object (e.g., a stylus or finger) contacting surface 105, and causes an image of the surface or object to be generated. This image is detected by optical sensor 115. Direction and distance of movement can be determined by a series of such detected images. In one embodiment, reflected images are focused by a lens onto a CCD array, the lens and CCD array being included in optical sensor 115 (note that other photo-sensitive elements can be used in place of CCD array). Each image can be represented by a number of pixels on the CCD array (e.g., 3 pixels by 3 pixels array, or 18 pixels by 18 pixels array). A difference between consecutive images indicates movement, while no difference between consecutive images indicates lack of movement. Such image difference data can be determined by optical sensor 115, and then be communicated to MCU 120 via bus 117, which is coupled to a number of I/O ports of MCU 120 (e.g., one I/O port for a bus having one line, or two I/O ports for a bus 117 having two lines, or four I/O ports for a bus 117 having four lines). MCU 120 can then perform any analysis and processing on the image difference data. Alternatively, the image data detected by optical sensor 115 can be provided to MCU 120, and MCU 120 can determine the image difference data, as well as perform any analysis and processing. Alternatively, optical sensor 115 can translate the image difference data into the likes of cursor position data or scrolling direction and distance data, and provide such data to MCU 120 for any analysis and additional processing.

In one embodiment, image difference data is generated by optical sensor 115, where each pixel of a CCD array included in optical sensor 115 corresponds to a bit of a bit vector. An image reflected onto the CCD array causes a number of the pixels to turn on. A pixel that is on might correspond to a bit that is a logical one, while a pixel that is off might correspond to a bit that is a logical low. As such, each detected image can be represented by a bit vector. The bit vectors corresponding to consecutive detected images can be logically XORed (exclusive OR operation). The result of the XOR operation represents the image difference data. Other logical operations can be used to determine image difference data as well. Such image difference data is in binary form and therefore can be readily analyzed and processed by, for example, an algorithm running in MCU 120. Likewise, such image difference data can be readily translated into the likes of cursor position data, or scrolling direction and distance data by optical sensor 115 or MCU 120.

In alternative embodiments, optical sensor 115 can be replaced by other sensing-type components 116 or assemblies for sensing the likes of movement, vibration, drift or other activity associated with a wireless device or system. For example, interferometers, velocimeters, motion detectors and drift detectors can be employed in device 101 for sensing such activity.

Optical sensor 115 receives power from power regulator 140 via switch 150a. There are a number of ways for controlling the power that is consumed by optical sensor 115. For example, optical sensor 115 can have an internal algorithm that switches the optical sensor 115 between a full power mode and a low power mode depending on whether a change in detected images is sensed. During active periods where detected consecutive images are different from one another thereby indicating movement, the algorithm would command the full power mode. In contrast, during inactive periods where detected consecutive images are the same thereby indicating lack of movement, the algorithm would command the low power mode. When power consumption of optical sensor 115 is being controlled internally, it is in its native mode of operation.

Another way to control the power that is consumed by optical sensor 115 is by configuring optical sensor 115 with an internal switch that can be externally controlled. For example, the internal switch can be controlled by MCU 120 via bus 117. This internal switch of optical sensor 115 can be implemented, for example, in hardware, software, firmware, or any combination thereof. In a first state, the internal switch allows optical sensor 115 to operate in its native mode. In a second state, however, the native mode of optical sensor 115 is disabled thereby allowing external control of optical sensor 115. For instance, a number of algorithms running in MCU 120 can be programmed to effect a comprehensive power management scheme on optical sensor 115. Bus 117 can be used to facilitate communication between MCU 120 and optical sensor 115. In one embodiment, bus 117 is a serial peripheral interface bus (SPI), but other suitable bus technologies and protocols can be implemented here as well.

Another way to control the power that is consumed by optical sensor 115 is by opening and closing switch 150a. Like switch 150b, switch 150a can be a metal oxide semiconductor (MOS) type switch, and has a control line that is coupled to an I/O port of MCU 120. Switch 150a can alternatively be integrated into MCU 120, or implemented via an I/O port of MCU 120. Other switch types having a state (e.g., open or closed) that is responsive to a control line can be used here as well. By opening switch 150a, all power to optical sensor 115 is completely removed thereby eliminating further power consumption by optical sensor 115. Once MCU 120 determines that optical sensor 115 needs power (e.g., based on data received from user interface 125), switch 150a can be closed accordingly.

MCU 120 provides an environment for processing information and data provided by the likes of user interface 125, optical sensor 115 and transceiver 130 (if applicable). MCU 120 can include, for example, a microprocessor or central processing unit (CPU) that is capable of executing instructions and algorithms for the likes of processing input data, for carrying out power management, and for providing data to transmitter 130. MCU 120 may also include (or have access to) other support functions such as additional CPUs, random access memory (RAM), read only memory (ROM), non-volatile memory devices (e.g., electrically erasable programmable ROM or flash memory), I/O ports, timers, comparators, buffers, logic units and other specific support functions. MCU 120 can also be configured with an internal low power mode where its power consumption is reduced (e.g., from normal power consumption mode to low power consumption mode) in response to inactivity at its I/O ports (e.g., based on edge detection). Other equivalent processing environments suitable for running a real-time process can also be used in place of MCU 120 (e.g., a single board computer).

In one embodiment, MCU 120 implements a power management scheme that is characterized by various modes of awareness based on, for example, input stimuli and statistical analysis. Input stimuli are provided to MCU 120 by user interface 125 and by optical sensor 115. MCU 120 analyzes the input stimuli, determines the mode of awareness in which device 101 will operate in response to the input stimuli, and provides data derived from that input stimuli to transmitter 130. If device 101 includes a transceiver 130 (in lieu of transmitter 130), MCU 120 can also receive other communication information from transceiver 130 as explained above.

MCU 120 can also determine the status of power source 145 by monitoring a power source status line coupled between an I/O port of MCU 120 and power source 145. For instance, if MCU 120 detects that the primary battery has reached its lowest acceptable threshold, MCU 120 can switch out the primary battery, and switch in a fresh back-up battery 146 as a replacement via switch 147. In the event that there is no back-up battery 146 available, MCU 120 can manifest a low battery state to the user indicating that the battery should be changed shortly (e.g., within the next 12 hours of use). This manifestation can be achieved by, for example, a LED indicator or display on device 101 (not shown), or by communicating the low battery state to the host system via transmitter 130. A driver corresponding to device 101 running on that host system can then prompt the user with a change battery message.

Figure 1B:
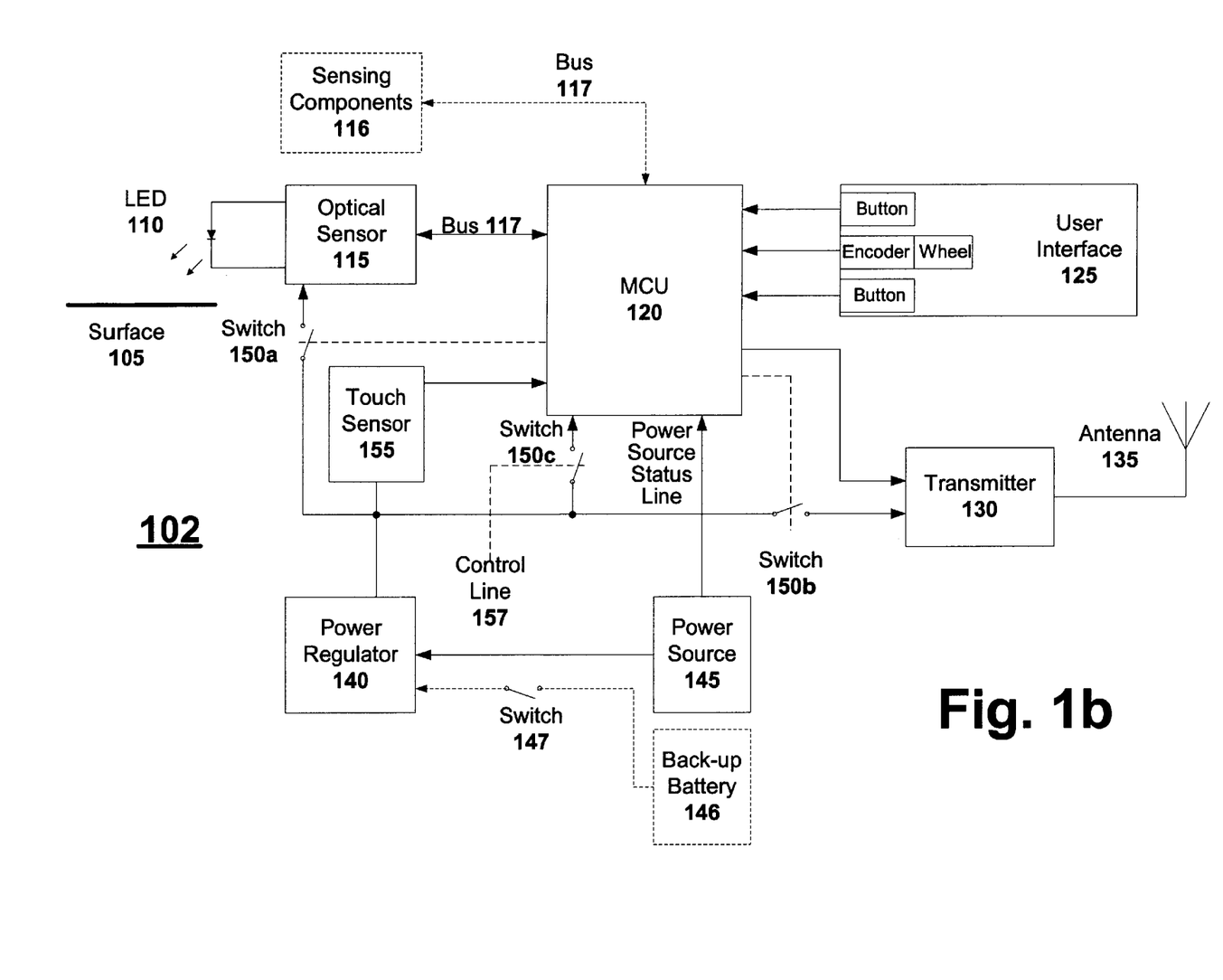
FIG. 1b illustrates a block diagram of a wireless input device that employs an optical sensor and a touch sensor in accordance with one embodiment of the present invention.

FIG. 1b illustrates a block diagram of a wireless input device that employs an optical sensor and a touch sensor in accordance with one embodiment of the present invention. Device 102 is similar to device 101 shown in FIG. 1a, except device 102 also includes a touch sensor 155. Touch sensor receives power from power regulator 140, and is coupled to an I/O port of MCU 120. Touch sensor 155, or a portion thereof can also be integrated into MCU 120. For example, a number of sensor elements can be disposed on the exterior of device 102 or integrated into the user interface elements of user interface 125, where each sensor is operatively coupled to the supporting electronic circuitry included in MCU 120.

Figure 1C:
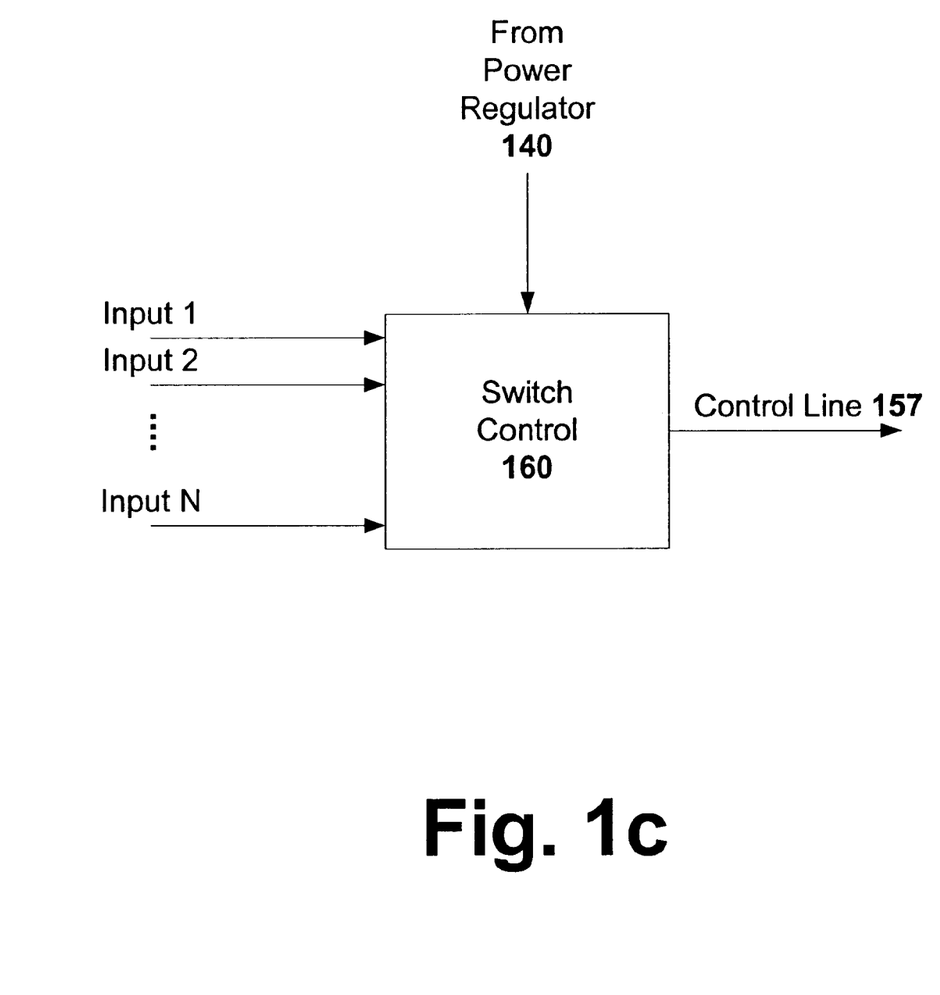
FIG. 1c illustrates a technique for generating a switch control line in accordance with one embodiment of the present invention.

In addition, device 102 can alternatively include switch 150c for switching power from power regulator 140 to MCU 120. Such an embodiment may be useful where MCU 120 is not configured with an internal low power mode as described above, or is otherwise associated with a power intensive profile (e.g., continuously operates at greater than 100 microamps). Switch 150c has a state (e.g., open or closed) that depends on control line 157, which is derived from signals from the likes of signals from touch sensor 155, or user interface 125, or other sensing components or assemblies that sense user-based activity that indicates device 102 must apply power to MCU 120 and wake up (e.g., a dedicated "wake-up" button or sensor), or a combination thereof. One technique for providing control line 157 in response to such user-based activity is shown in FIG. 1c, which will be discussed in turn.

Like switches 150a and 150b, switch 150c can be a metal oxide semiconductor (MOS) type switch. Other switch types having a state (e.g., open or closed) that is responsive to a control line can be used here as well (e.g., a bipolar junction transistor-based switch). Switch 150c can alternatively be integrated into touch sensor 155. By opening switch 150c, all power to MCU 120 is completely removed thereby eliminating further power consumption by MCU 120. Once user-based activity is received control line 157 is activated, and switch 150c is closed accordingly. In one embodiment, whether control line 157 is activated or not depends on whether touch sensor 155 is triggered thereby indicating the presence of a user. In such an embodiment, once touch sensor 155 triggers in response to the presence of a user (e.g., user is actually touching device 102 or is within one inch of touching device 102), control line 157 is activated thereby closing switch 150c. Power from power regulator 140 is thus switched to MCU 120. On the other hand, if no user presence is reported by touch sensor 155, then control line 157 is deactivated and remains so until a trigger signal from touch sensor 155 is produced. When switch 150c is deactivated, power to MCU 120 is switched out.

Note that control line 157 can be derived from a number of sources, whether from one or more touch sensors 155, one or more user interface elements from user interface 125, a dedicated "wake-up" button or sensor, or a combination thereof.

In general, touch sensor 155 is for sensing the touch or proximal presence of a user, and notifying MCU 120 accordingly. Thus, touch sensor 155 may be implemented in a number of technologies, including both direct touch sensing technology and proximity sensing technology that does not require actual contact. In addition, device 102 may include a number of touch sensors 155, each one being strategically located on or within device 102 (e.g., on the palm, index finger and thumb areas of a wireless optical mouse). As such, when device 102 is touched or approached by a user's hand or other appendage (e.g., finger, foot, forearm, stylus, prosthetic), any one or more of touch sensors 155 will trigger thereby notifying MCU 120 of the user's presence and intent to use device 102. In response, MCU 120 might modify the power mode of device 102. For instance, an algorithm running in MCU 120 might receive the output signal and transition the mode of operation of device 102 from a power saving mode to a full power run mode.

In one embodiment, touch sensor 155 is implemented using the circuitry of a touchpad or touch tablet that senses a users touch or pressure from a stylus or finger. Note that not all the circuitry or functionality of the touchpad or tablet need be employed. Rather, only the componentry for sensing the presence of a user and manifesting that presence as an electrical signal is needed. In such an embodiment, the presence of a user touch could be detected and manifested as a logical low signal at the output of touch sensor 155, which might normally be a logical high signal when there is no user touch. This output can be provided to an I/O port of MCU 120. Alternatively, touch sensor 155 can be implemented with a pressure sensitive switch that, when contacted by the user (hand, finger or otherwise) similarly generates a logical low signal at the output of touch sensor 155.

In an alternative embodiment, touch sensor 155 can be implemented with an electric field sensor that can detect the presence of human tissue (e.g., by way of resistance, capacitance or charge). In such an embodiment, the output signal of touch sensor 155 might be in one range (e.g., −50 to 50 microvolts) with no user presence, and a second range (e.g., 150 to 500 microvolts) during user presence. Regardless, MCU 120 would receive the output signal via an I/O port and act accordingly. Note that in such an embodiment, the user need not actually touch device 102 to trigger touch sensor 155. Rather, the proximal location of the user's hand to device 102 can be sufficient to trigger touch sensor 155 (e.g., within one inch of device 102).

Numerous other touch sensing technologies can be employed to realize touch sensor 155. For example, capacitive sensors, motion detectors, light level sensors, weight sensors, heat sensors and infrared detectors can be used alone or in combination to effect touch sensor 155. The type of technology selected for implementing touch sensor 155 depends on a number of factors such as power, cost, and space limitations associated with device 102. Regardless of what technology is used, the effect is that MCU 120 has access to user presence data, whether the user be physically touching device 102 or proximally touching device 102.

In another embodiment, a switch 150d (not shown) similar to switches 150a–c could be coupled between power source 145 and power regulator 140. Switch 150d, which could alternatively be internal to power regulator 140, would allow power regulator 140 to be effectively switched to an off position thereby conserving power (e.g., even when there is no load on power regulator 140, it may still consume power). In such an embodiment, touch sensor 155 might be coupled directly to power source 145, and a trigger signal from touch sensor 155 could be used as a control line for controlling the state of switch 150d. Alternatively, control line 157 could be used to control the state of switch 150d, assuming that the components or assembly generating control line 157 can receive power directly from power source 145. Note that any one of switches 150a, 150b, and 150c may or may not be included in an embodiment employing switch 150d depending on factors such as the desired levels of power conservation.

Numerous other switching configurations for switching out components included in device 101 or 102 will be apparent in light of this disclosure. For descriptive purposes, switches 150a–d are referred to as power switches because they switch in power.

FIG. 1c illustrates a technique for generating a switch control line in accordance with one embodiment of the present invention. In general, control line 157 is derived from a number of signals (e.g., input 1 to input N), and is either active (e.g., logical low) or inactive (e.g., logical high). Control line 157 can be used to control switch 150c as shown in FIG. 1b. In one embodiment, control line 157 is derived from four signals: input 1—an output signal of a touch sensor 155a (e.g., sensing touch on the palm area of a wireless optical mouse); input 2—an output signal of a touch sensor 155b (e.g., sensing touch on the thumb area of a wireless optical mouse); input 3—an output signal associated with a first button from user interface 125 (e.g., right mouse button); and input 4—an output signal associated with a second button from user interface 125 (e.g., left mouse button). Each of these signals can be associated with an active low state, and would normally be a logical high (e.g., when no user presence is detected by touch sensors 155 or no user interface 125 button is clicked). Note that alternative embodiments may have less or more input signals (e.g., one input signal or eight input signals) from which control line 157 is derived.

Inputs 1 through input N are applied to switch control 160, which is powered by power regulator 140. Alternatively, switch control 160 can be powered directly by power source 145. In one embodiment, switch control 160 is implemented with a multiple input logical AND gate. In such an embodiment, control line 157 is active (e.g., logical low) when one or more of the inputs to the AND gate is low thereby indicating the presence of a user and or button action. On the other hand, control line 157 is inactive (e.g., logical high) when all the inputs to switch control 160 are high thereby indicating no user presence or button action. Other logical configurations and devices can be used to implement switch control 160, such as a programmable logic array or other logic gate types (e.g., buffer or inverter). Likewise, a microprocessor associated with low power consumption (e.g., less than 100 microamps) can be used as switch control 160. Regardless of how switch control 160 is implemented, a benefit is that power consumption associated with generating control line 157 is less power than the power consumption that would occur is MCU 120 was not switched out.

Figure 2:
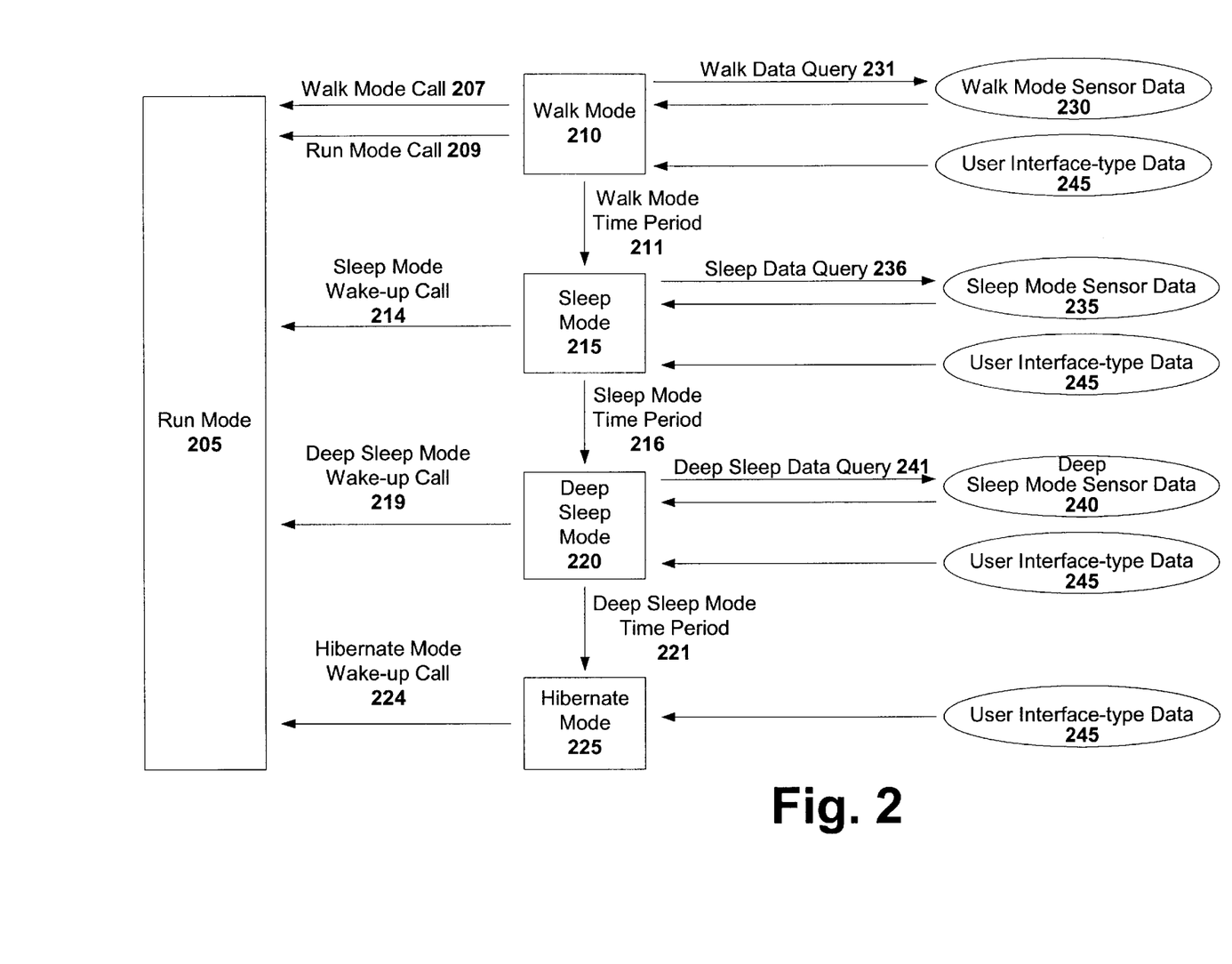
FIG. 2 illustrates a flow diagram of a power management algorithm employed in a wireless optical input device in accordance with one embodiment of the present invention.

FIG. 2 illustrates a flow diagram of a power management algorithm employed in a wireless optical input device in accordance with one embodiment of the present invention. This algorithm can be implemented by executable code running in a processing environment included in the wireless device. For example, the executable code might be stored in a ROM included in a MCU of a wireless mouse having an optical sensor for effecting cursor movement. The executable code can be loaded into a RAM included in the MCU and executed to give effect to the power management scheme represented by algorithm. Note, however, that the algorithm can be implemented in a number of processing environments, and is not intended to be limited to operation in any one embodiment or type of wireless device, such as the ones illustrated in FIGS. 1a and b. In addition, the algorithm may be comprised of a number of modules or subroutines that operate to effect an overall power management scheme in accordance with the principles of the present invention.

Overview

The power management algorithm illustrated in FIG. 2 defines five modes of operation: run mode 205, walk mode 210, sleep mode 215, deep sleep mode 220 and hibernate mode 225. Run mode 205 is a full power mode, while walk mode 210, sleep mode 215, deep sleep mode 220 and hibernate mode 225 are time-staggered, power saving modes. Each of the power saving modes introduces power conserving measures that are more comprehensive than the previous power mode. For instance, walk mode 210 might conserve 75% power as compared to full power of run mode 205. Similarly, sleep mode 215 might conserve 90% power as compared to full power of run mode 205, while deep sleep mode 220 might conserve 95% power as compared to full power of run mode 205. Hibernate mode, on the other hand, might conserve 99% power as compared to full power of run mode 205.

As time advances without any sensed activity (thereby indicating lack of use of the associated wireless device), the device is transitioned from one power mode to the next power mode, until hibernate mode 225 is reached. In the embodiment shown, the power modes are transitioned in the following order during a period of inactivity: from run-mode 205 to walk mode 210 to sleep mode 215 to deep sleep mode 220 to hibernate mode 225. The time period allocated for a particular power mode to operate can be, for example, based on detection of inactivity or statistics. Likewise, the time period allocated for a particular mode to operate can be a preset time period (e.g., as measured by a timer included in MCU 120). A combination of such time periods can also be used.

For instance, the time period between run mode 205 and walk mode 210 can be based on an initial detection of inactivity. In such an embodiment, as long as there is continued activity, run mode 205 will be sustained. However, the mode of operation will transition from run mode 205 to walk mode 210 upon the first indication of inactivity (e.g., within 10 milliseconds of the inactive period's start). On the other hand, the walk mode time period 211 can be a preset time period (e.g., 1 minute of inactivity). The sleep mode time period 216 can also be a preset time period (e.g., 10 minutes of inactivity). The deep sleep mode time period 221 can be a preset time period initially (e.g., 3 hours of inactivity), but can later be refined to a different time period (e.g., ½ hour) based on statistical analysis and patterns of prior use. Such patterns of prior use can be, for example, monitored, stored and analyzed by MCU 120 as will be explained in turn.

Various modules of the algorithm can be programmed to receive activity data from user interface elements, or from an activity sensing device, assembly or circuit such as an optical sensor 115 or other activity sensing componentry that can provide data characterizing the sensed activity. In this way, the algorithm has access to data that is relevant to activity of the associated wireless device. The algorithm can then perform analysis (e.g., quantitative and qualitative) on the activity data to determine if a change in power mode is warranted by either inactivity or activity. Inactivity dictates the mode of operation be transitioned to the next power saving mode, while activity after a period of no activity dictates the mode of operation be transitioned to the to run mode 205.

Activity can be, for example, movement of an associated wireless device as detected by an optical sensor with reference to a surface (e.g., movement of a wireless optical mouse). Likewise, activity can be indicated by user interface elements, such as a button press or a wheel roll of a wireless optical mouse. The corresponding activity data might be a series of images or image difference data from an optical sensor included in the wireless device, or various logical signals from user interface elements of the wireless device.

Run Mode

Run mode 205 is a full power mode, and is associated with a run mode module of the algorithm. For the sake of discussion, assume that the algorithm is associated with a wireless device as illustrated in FIGS. 1a and b. Further assume that the device is a wireless optical mouse that is actively being used by some user. When the mode of operation is run mode 205, the native mode of optical sensor 115 can be enabled, and switches 150a and 150b are closed. As such, both optical sensor 115 and transmitter 130 are in their on states. If included, switch 150c is also closed thereby switching MCU 120 to its on state. Likewise, if included, switch 150d is also closed thereby switching power regulator 140 to its on state. Note that the actual order of switching may depend on factors such as component sensitivity and biasing, and proper power sequencing protocols. User interface-type inputs from user interface 125, such as single, double and triple button clicks or wheel rolling, as well as mouse movement over surface 105, are indicative of run mode 205 activity. The run mode module can perform any necessary translation on such user interface-type inputs and movement data (if not already performed by, for example, optical sensor 115), and communicates the translated data to the host receiver via transmitter 130. Translation of such data can also be performed (e.g., in part or totally) by the corresponding host receiver that receives the wireless transmission from transmitter 130. Alternatively, no data translation may be necessary depending on the wireless device.

The wireless device will operate in run mode 205 so long as there is sustained device activity. However, once a lack of activity is detected, the mode of operation transitions from run mode 205 to walk mode 210 as will now be explained.

Walk Mode

Walk mode 210 is associated with a walk mode module of the algorithm. This walk mode module runs in parallel with the run mode module, and can transition the mode of operation of the wireless device from run mode 205 to walk mode 210, and from walk mode 210 to run mode 205. In this sense, the walk mode module effectively has the ability to enable and disable run mode 205. When run mode 205 is enabled, the run mode module has full control of the associated wireless device. However, when run mode 205 is disabled, the walk mode module has full control of the wireless device. Whether run mode 205 is enabled or disabled by the walk mode module depends on walk mode sensor data 230, which is periodically polled (e.g., every 10 milliseconds) by the walk mode module as will now be explained. In addition, user interface-type data 245 from user interface elements such as buttons, wheels, joy sticks or roller balls will cause run mode 205 to be enabled by the walk mode module.

The walk mode module issues a walk data query 231 to the activity sensing device or assembly (e.g., optical sensor of wireless optical mouse). This data query 231 is seeking walk mode sensor data 230 in order to determine if run mode 205 should be transitioned to walk mode 210, or if walk mode 210 should be transitioned to run mode 205. Walk data query 231 is issued periodically. In one embodiment, walk data query 231 is issued approximately every 10 milliseconds, although other polling rates such as every 1 millisecond or every 50 milliseconds, can also be used depending on factors such as the desired device response time and the power of the processor running the algorithm. This polling rate effectively defines the time it takes for an associated wireless device to transition from walk mode 210 to run mode 205, or vice versa depending on walk mode sensor data 230.

In the embodiment shown, an optical sensor responds to each walk data query 231. The response includes walk mode sensor data 230. Walk mode sensor data 230 can be, for example, a series of images or image difference data generated by the optical sensor (e.g., optical sensor 115), and can be expressed as bit vectors to facilitate processing as explained above. The walk mode module can interrogate the received walk mode sensor data 230. For example, the walk mode module can compare the latest image data received with the previous image data received in order to determine the image difference data. Analysis of the image difference data can then be performed to determine if a power mode change is warranted. Alternatively, the walk mode module can just perform analysis if the polled walk mode sensor data 230 is already in the form of image difference data (e.g., optical sensor performed the difference operation). In one embodiment, the analysis performed by the walk mode module includes determining if the image difference data is a non-zero value thereby indicating movement. If movement is detected during walk mode 210, then the mode of operation transitions from walk mode 210 to run mode 205 as is explained below.

User interface-type data 245 of the wireless device, on the other hand, generally requires less or no analysis because it represents a distinct and deliberate act of the user, and is therefore less likely to be representative of false activity. Thus, if user interface-type data 245 is detected during walk mode 210, then the mode of operation transitions from walk mode 210 to run mode 205.

For the sake of clarity, false activity represents movement or other activity that was not intended by the user, or is atypical movement given the circumstances. For example, when a user unintentionally moves the mouse by bumping the surface upon which the mouse is resting, the resulting movement can be qualified as false activity. Likewise, if a period of substantial activity (e.g., mouse moved 5 centimeters to double-click on folder and then double-clicked document) is followed by a period of no activity (e.g., while user reads opened document), the next movement should likely be substantial (e.g., move to upper right corner to close document, or to select hypertext). If it is not substantial (e.g., less than 10 millimeters), then the resulting movement can be qualified as false activity. On the other hand, if the movement is substantial (e.g., greater than 10 millimeters), then the resulting movement can be qualified as true activity.

Transitions Between Walk and Run Modes

If the wireless device associated with the algorithm is operating in run mode 205, and no movement (e.g., as indicated by walk mode sensor data 230) or user interface-type data 245 is detected, then the walk mode module effectively disables run mode 205 by issuing a walk mode call 207, and the mode of operation accordingly transitions from run mode 205 to walk mode 210. Thus, the walk mode module is in full control of the device. In the context of a wireless device as illustrated in FIGS. 1a and b, when the mode of operation is transitioned to walk mode 210, the native mode of optical sensor 115 is disabled, and switch 150b is opened. As such, transmitter 130 is in its off state thereby conserving power. The mode of operation remains walk mode 210 until walk mode time period 211 expires, walk mode sensor data 230 indicates movement, or user interface-type data 245 is received.

If any movement (e.g., as indicated by walk mode sensor data 230) or any user interface-type data 245 is detected during walk mode 210, then the walk mode module issues run mode call 209 thereby enabling run mode 205, and the mode of operation accordingly transitions from walk mode 210 to run mode 205. The run mode module takes control of the device (or delegates that control to a "native mode"), switches transmitter 130 back in by closing switch 150b, performs any necessary translation, and provides the translated data to transmitter 130 for transmission to the host receiver. The mode of operation remains run mode 205 so long as walk mode sensor data 230 indicates movement or user interface-type data 245 is being received. If the polled walk mode sensor data 230 indicates lack of movement and no user interface-type data 245 is being received during run mode 205, then the walk mode module disables run mode 205 by issuing walk mode call 207, and walk rode 210 takes over as described above.

In the event, however, that the mode of operation remains walk mode 210 until walk mode time period 211 expires, then the mode of operation transitions to sleep mode 215 as will now be explained.

Sleep Mode

Sleep mode 215 is associated with a sleep mode module of the algorithm, which is engaged upon expiration of walk mode time period 211. The mode of operation accordingly transitions from walk mode 210 to sleep mode 215. The sleep mode module runs in parallel with the run mode module, and can transition the mode of operation of the wireless device from sleep mode 215 to run mode 205. In this sense, the sleep mode module effectively has the ability to enable run mode 205. Whether run mode 205 is enabled by the sleep mode module depends on sleep mode sensor data 235, which is periodically polled (e.g., every 100 milliseconds) by the sleep mode module as will now be explained. In addition, user interface-type data 245 from user interface elements such as buttons, wheels, joy sticks or roller balls can cause run mode 205 to be enabled by the sleep mode module.

The sleep mode module issues a sleep data query 236 to the activity sensing devices (e.g., optical sensor of wireless optical mouse). This data query 236 is seeking sleep mode sensor data 235 in order to determine if sleep mode 215 should be transitioned to run mode 205. Sleep data query 231 is issued periodically. In one embodiment, sleep data query 231 is issued approximately every 100 milliseconds, although other polling rates such as every 1 microsecond or every 500 milliseconds, can also be used depending on factors such as the desired device response time and the power of the processor running the algorithm. This polling rate effectively defines the time it takes for an associated wireless device to transition from sleep mode 215 to run mode 205 depending on sleep mode sensor data 235.

In the embodiment shown, an optical sensor responds to each sleep data query 236. This response includes sleep mode sensor data 235. Sleep mode sensor data 235 can be, for example, a series of images or image difference data generated by the optical sensor (e.g., optical sensor 115), and can be expressed as bit vectors to facilitate processing as explained above. The sleep mode module can interrogate the received sleep mode sensor data 235. The previous discussion with regards to image analysis performed by the walk mode module equally applies to the sleep mode module. In addition, if movement is detected, the analysis performed by the sleep mode module may further include qualifying the image difference so as to determine if the movement qualifies as true activity.

For instance, if the movement detected satisfies a predetermined threshold of quality (e.g., distance of movement is greater than 5 millimeters), then it is considered true activity and the mode of operation transitions from sleep mode 215 to run mode 205. Otherwise, the movement is considered false activity, and the mode of operation remains sleep mode 215. Likewise, an image difference comparison can be made thereby qualifying the degree to which the images are different. The greater the degree of difference between the images, the more likely that true activity has been sensed. On the other hand, the greater the similarity between the images, the more likely that false activity has been sensed. For example, if more than 25% of the pixels associated with one image have values that are different from the values of the corresponding pixels associated with a consecutive image, then true activity is sensed and the mode of operation transitions from sleep mode 215 to run mode 205. Otherwise, the movement is considered false activity, and the mode of operation remains sleep mode 215. The degree of difference between images that indicates true activity depends on factors such as the resolution and sensitivity of the sensing device, the sensing area (e.g., size and shape) and the desired performance of the associated device.

If user interface-type data 245 is detected during sleep mode 215, on the other hand, no qualification is necessary and the mode of operation transitions from sleep mode 215 to run mode 205.

Transitions From Sleep to Run Mode

If the wireless device associated with the algorithm is operating in sleep mode 215, and no movement (e.g., as indicated by sleep mode sensor data 235) or user interface-type data 245 is detected, then the sleep mode module is in full control of the device. In the context of a wireless device as illustrated in FIGS. 1a and b, when the mode of operation is sleep mode 215, the native mode of optical sensor 115 is disabled, and switch 150b is opened. As such, transmitter 130 is in its off state thereby conserving power. The mode of operation remains sleep mode 215 until sleep mode time period 216 expires, sleep mode sensor data 235 indicates movement that qualifies as true activity, or user interface-type data 245 is received.

If qualified movement (e.g., as indicated by sleep mode sensor data 235) or any user interface-type data 245 is detected during sleep mode 215, then the sleep mode module issues sleep mode wake-up call 214 thereby enabling run mode 205, and the mode of operation accordingly transitions from sleep mode 215 to run mode 205. The run mode module then takes control of the device and proceeds as previously explained.

In the event, however, that the mode of operation remains sleep mode 215 until sleep mode time period 216 expires, then the mode of operation transitions to deep sleep mode 220 as will now be explained.

Deep Sleep Mode

Deep sleep mode 220 is associated with a deep sleep mode module of the algorithm, which is engaged upon expiration of sleep mode time period 216. The mode of operation accordingly transitions from sleep mode 215 to deep sleep mode 220. The deep sleep mode module runs in parallel with the run mode module, and can transition the mode of operation of the wireless device from deep sleep mode 220 to run mode 205. In this sense, the deep sleep mode module effectively has the ability to enable run mode 205. Whether run mode 205 is enabled by the deep sleep mode module depends on deep sleep mode sensor data 240, which is periodically polled (e.g., every 1 second) by the deep sleep mode module as will now be explained. In addition, user interface-type data 245 from user interface elements such as buttons, wheels, joy sticks or roller balls can cause run mode 205 to be enabled by the deep sleep mode module.

The deep sleep mode module issues a deep sleep data query 241 to the activity sensing devices (e.g., optical sensor of wireless optical mouse). This data query 241 is seeking deep sleep mode sensor data 240 in order to determine if deep sleep mode 220 should be transitioned to run mode 205. Deep sleep data query 241 is issued periodically. In one embodiment, deep sleep data query 241 is issued approximately every 1 second, although other polling rates such as every 400 milliseconds or every 2 seconds, can also be used depending on factors such as the desired device response time and the power of the processor running the algorithm. This polling rate effectively defines the time it takes for an associated wireless device to transition from deep sleep mode 220 to run mode 205 depending on deep sleep mode sensor data 240.

In the embodiment shown, an optical sensor responds to each deep sleep data query 241. This response includes deep sleep mode sensor data 240. Deep sleep mode sensor data 240 can be, for example, a series of images or image difference data generated by the optical sensor (e.g., optical sensor 115), and can be expressed as bit vectors to facilitate processing as explained above. The deep sleep mode module can interrogate the received deep sleep mode sensor data 240. The previous discussion with regards to image analysis performed by the walk mode module equally applies to the deep sleep mode module. In addition, if movement is detected, the analysis performed by the deep sleep mode module may further include determining the distance and direction of the movement so as to determine if the movement qualifies as true activity. For instance, if the movement detected satisfies a predetermined threshold of quality (e.g., distance of movement is greater than 10 millimeters), then it is considered true activity and the mode of operation transitions from deep sleep mode 220 to run mode 205. Otherwise, the movement is considered false activity, and the mode of operation remains deep sleep mode 220. Likewise, an image difference comparison can be made thereby qualifying the degree to which the images are different. For example, if more than 33% of the pixels associated with one image have values that are different from the values of the corresponding pixels associated with a consecutive image, then true activity is sensed and the mode of operation transitions from deep sleep mode 220 to run mode 205. Otherwise, the movement is considered false activity, and the mode of operation remains deep sleep mode 220. Note that the predetermined threshold of quality associated with deep sleep mode 220 is more stringent than the predetermined threshold of quality associated with sleep mode 215. As such, transitioning from deep sleep mode 220 to run mode 205 is effectively more difficult than transitioning from sleep mode 215 to run mode 205.

Alternatively, deep sleep mode 220 can have a predetermined threshold of quality that is the same as that of sleep mode 215. Note, however, that the reaction time for transitioning from deep sleep mode 220 to run mode 205 (based on polling rate of deep sleep sensor data 240) is longer than the reaction time for transitioning from sleep mode 215 to run mode 205 (based on polling rate of sleep sensor data 235).

User interface-type data 245 detected during deep sleep mode 220 can also be qualified. For instance, button clicks and wheel movement translating to more than 5 millimeters of scrolling can be qualified as true activity, and the mode of operation transitions from deep sleep mode 220 to run mode 205. On the other hand, wheel movement translating to less than 5 millimeters of scrolling can be qualified as false activity and ignored. Thus, the mode of operation remains deep sleep mode 220.

Transitions From Deep Sleep to Run Mode

If the wireless device associated with the algorithm is operating in deep sleep mode 220, and no movement (e.g., as indicated by deep sleep mode sensor data 240) or user interface-type data 245 is detected, then the deep sleep mode module is in full control of the device. In the context of a wireless device as illustrated in FIGS. 1a and b, when the mode of operation is deep sleep mode 220, the native mode of optical sensor 115 is disabled, and switch 150b is opened. As such, transmitter 130 is in its off state thereby conserving power. The mode of operation remains deep sleep mode 220 until deep sleep mode time period 221 expires, deep sleep mode sensor data 240 indicates movement that qualifies as true activity, or user interface-type data 245 that qualifies as true activity is received.

If qualified movement (e.g., as indicated by deep sleep mode sensor data 240) or qualified user interface-type data 245 is detected during deep sleep mode 220, then the deep sleep mode module issues deep sleep mode wake-up call 219 thereby enabling run mode 205, and the mode of operation accordingly transitions from deep sleep mode 220 to run mode 205. The run mode module then takes control of the device and proceeds as previously explained.

In the event, however, that the mode of operation remains deep sleep mode 220 until deep sleep mode time period 221 expires, then the mode of operation is transitioned to hibernate mode 225 as will now be explained.

Hibernate Mode

Hibernate mode 225 is associated with a hibernate mode module of the algorithm, which is engaged upon expiration of deep sleep mode time period 221. The mode of operation accordingly transitions from deep sleep mode 220 to hibernate mode 225. The hibernate mode module runs in parallel with the run mode module, and can transition the mode of operation of the wireless device from hibernate mode 225 to run mode 205. In this sense, the hibernate mode module effectively has the ability to enable run mode 205. Whether run mode 205 is enabled by the hibernate mode module depends on what type of user interface-type data 245 is received during hibernate mode 225.

For example, button clicks can be qualified as true activity, and the mode of operation transitions from hibernate mode 225 to run mode 205. On the other hand, wheel movement of any kind can be qualified as false activity and ignored. Thus, the mode of operation remains hibernate mode 225.

Transitions from Hibernate to Run Mode

If the wireless device associated with the algorithm is operating in hibernate mode 225, and no user interface-type data 245 is detected, then the hibernate mode module is in full control of the device. In the context of a wireless device as illustrated in FIGS. 1a and b, when the mode of operation is hibernate mode 225, the native mode of optical sensor 115 is disabled, and switches 150a and 150b are opened. As such, optical sensor 115 and transmitter 130 are in their off states thereby conserving power. If included, switch 150c can also be opened thereby switching MCU 120 to its off state for additional power conservation. Likewise, if included, switch 150d can also be opened thereby switching power regulator 140 to its off state for additional power conservation. The mode of operation remains hibernate mode 225 until interface-type data 245 that qualifies as true activity is received.

If qualified user interface-type data 245 is detected during hibernate mode 225, then the hibernate mode module issues hibernate mode wake-up call 224 thereby enabling run mode 205, and the mode of operation accordingly transitions from hibernate mode 225 to run mode 205. The run mode module then takes control of the device and proceeds as previously explained.

Qualifying Activity as True or False Based on Statistical Analysis

As previously stated, activity data resulting from movement can be qualified as true or false activity based on distance and or direction of movement. Likewise, movement can also be qualified as true or false activity based on statistical or historical data. Such data can also be used to define patterns of use for the associated wireless device. Some patterns or types of use are unique to a specific user, while other patterns or types of use can be generically applied to a large group of people (e.g., mouse users).

For instance, most mouse users stop moving the mouse shortly after double-clicking to perform the likes of opening a document or executing an application. As such, movement following a period of inactivity after a double-click will likely be substantial (e.g., greater than 10 millimeters). For the sake of discussion, assume that the last user action involving a wireless optical mouse was a double-click (e.g., to open or execute) immediately followed by a move (e.g., to move cursor out of way). If the next move is less than 10 millimeters, then the move could be qualified as false activity. Such a statistical-based qualification can be used to complement or override a quantity-based qualification.

For example, recall that any detected movement in walk mode 210 can cause run mode 205 to be enabled. However, if a slight movement (e.g., 5 millimeters) is detected during walk mode 210 after a period of inactivity following a double-click, then such a movement can be qualified a false activity. Thus, a statistical-based qualification relevant to a particular type of use (e.g., movement after a double-click action of a mouse) can override a quantity-based qualification relevant to a less specific type of use (e.g., any movement).

Patterns or types of use that are unique to a specific user can also be used to complement or override quantity-based qualifications. Generally, a user's use of a device can be broken down into sessions, and each session can be further broken down into stages (e.g., an active stage, a semi-active stage and inactive stage). Each stage can, for example, can be associated with a mode of operation of the power management algorithm. For instance, the active stage can correspond to run mode 205 and walk mode 210, the semi-active stage can correspond to sleep mode 215 and deep sleep mode 220, and the inactive stage can correspond to hibernate mode 225. The time that each power mode is sustained can be monitored by a MCU of the associated wireless device, and stored in a non-volatile memory accessible by the MCU (or included in the MCU). After a number of sessions, average times and statistics can be determined.

Such average times and statistics effectively define a usage envelope of the associated wireless device. For example, a wireless optical mouse associated with a particular household or user might have the following usage envelope: (1) the mouse is generally never used before 6a.m. or after 12 a.m.; (2) the average walk mode time period 211 is 65 seconds; and (3) the average sleep mode time period 216 is 6 minutes; (3) the average deep sleep mode time period 221 is 45 minutes. Recorded statistics might further indicate that: (A) out of 120 hours of total use, only 2 minutes of use were between 12 a.m. and 6 a.m.; (B) out of 75 transitions from sleep mode 215 to run mode 205, 72 occurred within 9 minutes; and (C) out of 46 transitions from deep sleep mode 220 to run mode 205, 44 occurred within 25 minutes.

Such average times and statistics can be used to qualify future activity of the associated wireless mouse. For example, assume that the mouse is in deep sleep mode 220 and the time is 12:30 a.m. Shortly thereafter, an earthquake moves the mouse 15 millimeters. Assume that the quantity-based qualification to transition from deep sleep mode 220 to run mode requires a move of 10 millimeters or more. However, the a statistical-based qualification complements the quantity-based qualification by considering the timeliness of the move. In this case, a move of 20 millimeters or more between the hours of 12 a.m. and 6 a.m. is required to transition the mouse from deep sleep mode 220 to run mode 205. As such, the mouse remains in deep sleep mode 220 despite the earthquake.

Similarly, assume that the time is 1:30 p.m. and the mouse has been in deep sleep mode 220 for 40 minutes. Shortly thereafter, a cat residing in the household chases a real mouse across the desktop where the wireless optical mouse is resting. Although graceful in its approach, the cat bumps the wireless optical mouse causing it to move 10 millimeters. Again, assume that the quantity-based qualification to transition from deep sleep mode 220 to run mode requires a move of 10 millimeters or more. However, the statistical-based qualification complements the quantity-based qualification by considering the statistic that, if the mouse is going to come out of deep sleep mode, it will do so within 25 minutes over 95% of the time (e.g., 44/46 transitions). In this case, where the wireless optical mouse has been in deep sleep mode 220 for over 30 minutes, a move of 15 millimeters or more is required to transition the mouse from deep sleep mode 220 to run mode 205. As such, the wireless optical mouse remains in deep sleep mode 220 while the cat enjoys a late lunch.

Figure 3:
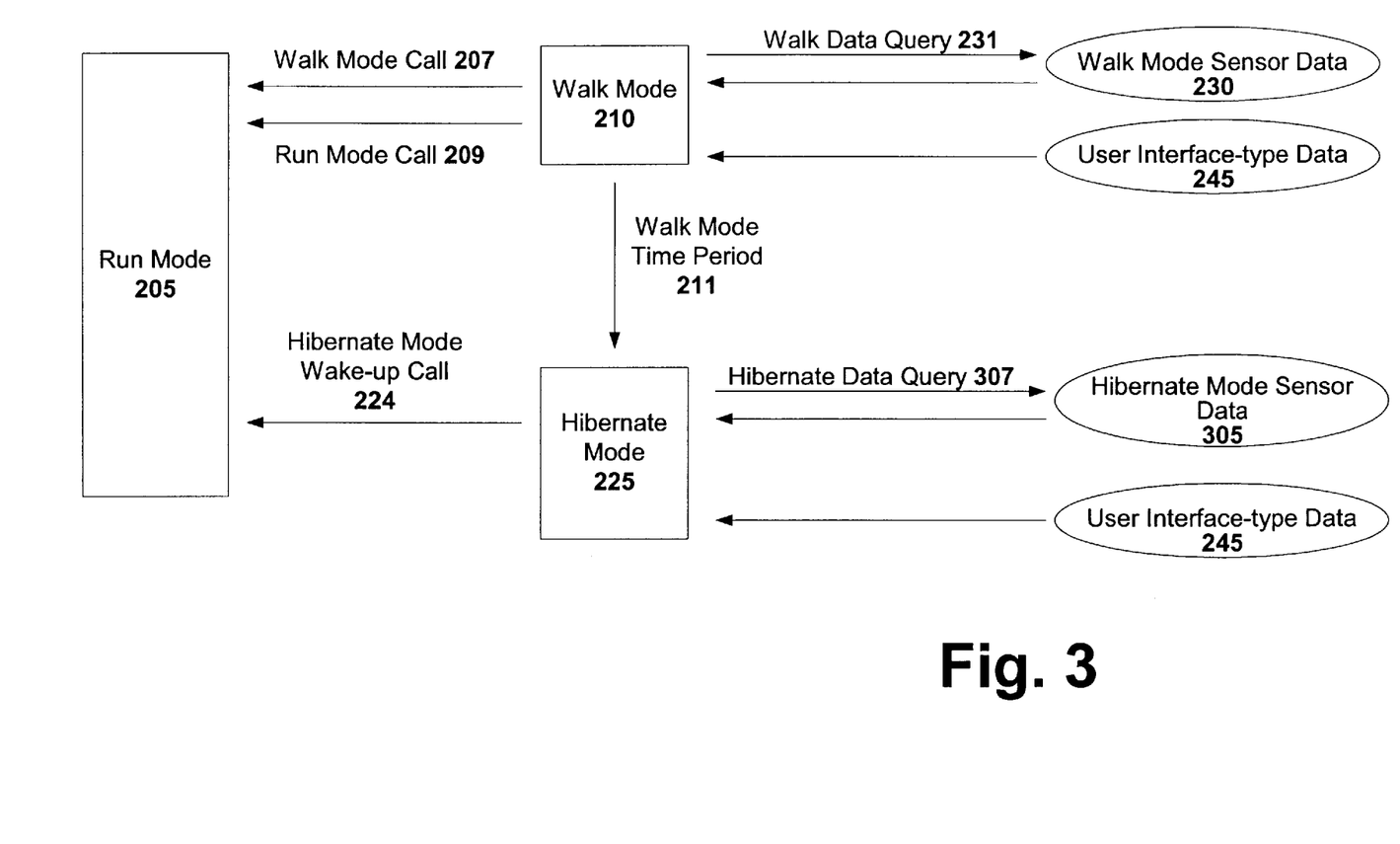
FIG. 3 illustrates a flow diagram of a power management algorithm employed in a wireless optical input device in accordance with another embodiment of the present invention.

FIG. 3 illustrates a flow diagram of a power management algorithm employed in a wireless optical input device in accordance with another embodiment of the present invention.

Overview

The power management algorithm illustrated in FIG. 3 is similar to the power management algorithm discussed with reference to FIG. 2. In this embodiment, however, the algorithm defines only three modes of operation: run mode 205, walk mode 210, and hibernate mode 225. The power modes are transitioned in the following order during a period of inactivity: from run-mode 205 to walk mode 210 to hibernate mode 225. The time period between run mode 205 and walk mode 210 can be based on an initial detection of inactivity, while the walk mode time period 211 can be a preset time period (e.g., 2 minutes of inactivity). In addition, Walk mode time period 211 can later be refined to a different time period (e.g., 1 minute of inactivity) based on statistical analysis and patterns of prior use.

Run Mode

Run mode 205 is a full power mode, and is associated with a run mode module of the algorithm. The previous discussion regarding run mode equally applies here. Thus, the associated wireless device will operate in run mode 205 so long as there is sustained device activity. However, once a lack of activity is detected, the mode of operation is transferred from run mode 205 to walk mode 210.

Walk Mode

Walk mode 210 is associated with a walk mode module of the algorithm. The previous discussion regarding the walk mode equally applies here. However, in the event, that the mode of operation remains walk mode 210 until walk mode time period 211 expires, then the mode of operation is transitioned to hibernate mode 225 (as opposed to sleep mode 215).

Hibernate Mode

Hibernate mode 225 is associated with a hibernate mode module of the algorithm, which is engaged upon expiration of walk mode time period 211. The mode of operation accordingly transitions from walk mode 210 to hibernate mode 225. The hibernate mode module runs in parallel with the run mode module, and can transition the mode of operation of the wireless device from hibernate mode 225 to run mode 205. In this sense, the hibernate mode module effectively has the ability to enable run mode 205. Whether run mode 205 is enabled by the hibernate mode module depends on hibernate mode sensor data 305, which is periodically polled (e.g., every 1 second) by the hibernate mode module as will now be explained. In addition, user interface-type data 245 from user interface elements such as buttons, wheels, joy sticks, or roller balls can cause run mode 205 to be enabled by the hibernate mode module. Such user interface-type data 245 can be used as an additional mechanism for waking the associated wireless device from hibernate mode 225 in the event that touch sensor 155 does not trigger (for what ever reason).

The hibernate mode module issues a hibernate data query 307 to the activity sensing devices (e.g., touch sensor 155). This data query 307 is seeking hibernate mode sensor data 305 in order to determine if hibernate mode 225 should be transitioned to run mode 205. Hibernate data query 307 is issued periodically. In one embodiment, hibernate data query 307 is issued approximately every 1 second, although other polling rates such as every 10 milliseconds or every 10 seconds, can also be used depending on factors such as the desired device response time and the power of the processor running the algorithm. This polling rate effectively defines the time it takes for an associated wireless device to transition from hibernate mode 225 to run mode 205 depending on hibernate mode sensor data 305.

In the embodiment shown, a sensor responds to each hibernate data query 307. This response includes hibernate mode sensor data 305. Hibernate mode sensor data 305 can be, for example, a signal from a touch sensor that is triggered by the charge, resistance, or capacitance of human tissue. If such a signal is received thereby indicating that the associated device is being touched, then the mode of operation transitions from hibernate mode 225 to run mode 205. Otherwise, the mode of operation remains hibernate mode 225. User interface-type data 245 detected during hibernate mode 225 can be qualified. For instance, button clicks and wheel movement translating to more than 5 millimeters of scrolling can be qualified as true activity, and the mode of operation transitions from hibernate mode 225 to run mode 205. On the other hand, wheel movement translating to less than 5 millimeters of scrolling can be qualified as false activity and ignored. Thus, the mode of operation remains hibernate mode 225.

In an alternative embodiment, hibernate mode sensor data 305 can be essentially included in user interface-type data 245. In such an embodiment, activity data (whether hibernate mode sensor data 305 or user interface-type data 245) would automatically be provided to the MCU when such data became available. Thus, no polling would be necessary (e.g., no need to periodically issue hibernate data query 307). As such, hibernate mode 225 could employ an additional power saving measure by switching out the MCU. The associated switch (e.g., 150c) could be opened during the hibernate mode, and closed in response to a run mode 205 enabling event (e.g., trigger signal from a touch sensor or a user interface element).

Transitions Between Hibernate and Run Modes

If the wireless device associated with the algorithm is operating in hibernate mode 225, and no hibernate mode sensor data 305 or user interface-type data 245 is detected, then the hibernate mode module is in full control of the device. In the context of a wireless device as illustrated in FIGS. 1a and b, when the mode of operation is hibernate mode 225, the native mode of optical sensor 115 is disabled, and switches 150a and 150b are opened. As such, optical sensor 115 and transmitter 130 are in their off states thereby conserving power. If included, switch 150c can be opened to switch MCU 120 to its off state for additional power conservation. Likewise, if included, switch 150d can be opened to switch power regulator 140 to its off state for additional power conservation. The mode of operation remains hibernate mode 225 until hibernate mode sensor data 305 indicates the touch of a user, or user interface-type data 245 that qualifies as true activity is received.

If hibernate mode sensor data 305 indicates the presence of a user, or qualified user interface-type data 245 is detected during hibernate mode 225, then the hibernate mode module issues hibernate mode wake-up call 224 thereby enabling run mode 205, and the mode of operation accordingly transitions from hibernate mode 225 to run mode 205. The run mode module then takes control of the device and proceeds as previously explained.

The foregoing description of the embodiments of the invention has been presented for the purposes of illustration and description. It is not intended to be exhaustive or to limit the invention to the precise form disclosed. Many modifications and variations are possible in light of the above teaching. For example, in the above description, the walk mode module detects lack of motion and user interface-type data, and disables run mode 205 by issuing walk mode call 207. In an alternative embodiment, run mode 205 can have access to sensor data (e.g., run mode sensor data) and user interface-type data thereby allowing run mode 205 to detect lack of motion and user interface-type data. In such an embodiment, rather than having walk mode 210 disable run mode 205 by issuing a walk mode call 207, run mode 205 could effectively disable itself by issuing the walk mode call 207 to the walk mode module, and the mode of operation would transition from run mode 205 to walk mode 210. It is intended that the scope of the invention be limited not by this detailed description, but rather by the claims appended hereto.

What is claimed is:

1. A wireless input device that allows a user to interact with a computer, the wireless input device comprising:
   a self-contained power source for providing power to the wireless input device;
   a processing unit that receives power from the self-contained power source and has a number of input/output ports, the processing unit for receiving and processing user interface-type data and movement data, and further configured to turn on and off responsive to a user activity;
   a user interface having a number of user interface elements, each user interface element being operatively coupled to one of the input/output ports, the user interface for allowing the user to provide user interface-type data to the processing unit;
   an optical sensor that receives power from the self-contained power source and is operatively coupled to one or more of the input/output ports of the processing unit via a bus, the optical sensor for characterizing movement relative to the wireless input device with a number of images, and for providing movement data that is derived from the images to the processing unit via the bus, and further configured to turn on and off responsive to a user activity, and wherein the optical sensor may operate in a native mode where the power consumption of the optical sensor is self-controlled by the optical sensor, the optical sensor further comprising a mode switch that is accessible to the processing unit via the bus, and in response to the processing unit setting the mode switch to a first state, the native mode of the optical sensor is disabled thereby allowing the power consumption of the optical sensor to be controlled by the processing unit; and
   a transmitter unit that receives power from the self-contained power source, and receives processed user interface-type data and movement data from the processing unit, the transmitter unit for transmitting the processed user interface-type data and movement data to a receiver associated with the computer, further configured to turn on and off responsive to a user activity.

2. The wireless input device of claim 1 wherein in response to the processing unit setting the mode switch to a second state, the native mode of the optical sensor is enabled thereby allowing the optical sensor to control its power consumption.

3. The wireless input device of claim 1 wherein the processing performed by the processing unit includes qualifying the movement data so as to determine if the associated movement is true user activity intended for operation of the wireless input device or false user activity that incidentally produced movement data on the wireless input device.

4. The wireless input device of claim 3 wherein the movement data is qualified based on distance of the associated movement.

5. The wireless input device of claim 3 wherein the movement data is qualified based on statistics characterizing the user's usage patterns associated with the wireless input device.

6. The wireless input device of claim 3 wherein the movement data is qualified based on a degree of difference between the images.

7. The wireless input device of claim 1 wherein the optical sensor includes at least one LED for providing light that is reflected off a surface or object, the reflected light being projected onto a photo-sensitive element included in the optical sensor.

8. The wireless input device of claim 1 further comprising:
a receiver unit that receives power from the power source, the receiver unit for receiving communication information from a host, and for providing the communication information to the processing unit.

9. The wireless input device of claim 1 wherein the processing performed by the processing unit includes translating the movement data into cursor position data.

10. The wireless input device of claim 1 wherein the movement data is translated into cursor position data by the optical sensor before it is provided to the processing unit.

11. The wireless input device of claim 1 wherein the wireless input device is a wireless optical mouse, and the optical sensor is for effecting cursor movement.

12. The wireless input device of claim 1 wherein the wireless input device is a wireless optical trackball, and the optical sensor is for effecting cursor movement.

13. The wireless input device of claim 1 wherein the wireless input device is a wireless optical touchpad, and the optical sensor is for effecting cursor movement.

14. The wireless input device of claim 1, wherein the native mode of the optical sensor includes at least three power consumption levels self-controlled by the optical sensor.

15. The wireless input device of claim 14, wherein the native mode of the optical sensor includes a run mode, a first walk mode, a second walk mode, and a sleep mode, each corresponding to a different power consumption level and wherein the optical sensor further comprises computing logic that controls the transition between the power consumption levels.

16. The wireless input device of claim 1, wherein the mode switch in the optical sensor is a semiconductor type switch.

17. The wireless input device of claim 1, wherein the optical sensor further comprises a control line operatively coupled to the processing unit for providing a power control signal to the processing unit.

18. A method of managing power consumption of a wireless device having a power management algorithm defining modes of operation including a run mode and a number of power saving modes, the method comprising:
in the run mode:
operating the wireless device at a first power level;
in response to receiving activity data, maintaining the mode of operation in the run mode; and
in response to receiving no activity data, transitioning the mode of operation to a first power saving mode;
in the first power saving mode:
operating the wireless device at a second power level that is less than the first power level;
in response to receiving activity data, transitioning the mode of operation to the run mode;
in response to receiving no activity data, maintaining the mode of operation in the first power saving mode; and
in response to a time period associated with the first power saving mode expiring after a period of receiving no activity data, transitioning the mode of operation to a second power saving mode;
in the second power saving mode:
operating the wireless device at a third power level that is less than the second power level;
receiving activity data characterized by a number of images;
determining if the received activity data qualifies as true activity or false activity based on a degree of difference between the images;
in response to the received activity data qualifying as true activity, transitioning the mode of operation to the run mode; and
in response to the received activity data qualifying as false activity, maintaining the second power saving mode.

19. The method of claim 18, wherein the first power saving mode comprises a first walk mode and the second power savings mode comprises a second walk mode.

20. The method of claim 18, wherein the first power level is momentarily restored while determining if the received activity data qualifies as true activity or false activity based on a degree of difference between the images.

21. A system for managing power consumption of a wireless device having a power management algorithm defining modes of operation including a run mode and a number of power saving modes, the system comprising:
means for operating the wireless device at a first power level associated with the run mode;
means for receiving activity data characterized by a number of images;
means for maintaining the mode of operation in the run mode in response to receiving activity data;
means for transitioning the mode of operation to a first power saving mode in response to receiving no activity data;
means for operating the wireless device at a second power level associated with a first power saving mode that is less than the first power level;
means for transitioning the mode of operation to the run mode in response to receiving activity data;
means for maintaining the mode of operation in the first power saving mode in response to receiving no activity data;
means for transitioning the mode of operation to a second power saving mode in response to the expiring of a time period associated with the first power saving mode of receiving no activity data;
means for operating the wireless device at a third power level associated with a second power savings mode that is less than the second power level;
means for determining whether the received activity data qualifies as true activity or false activity based on a degree of difference between the images;
means for transitioning the mode of operation to the run mode in response to the received activity data qualifying as true activity; and
means for maintaining the second power saving mode in response to the received activity data qualifying as false activity.

* * * * *